Figure 1:
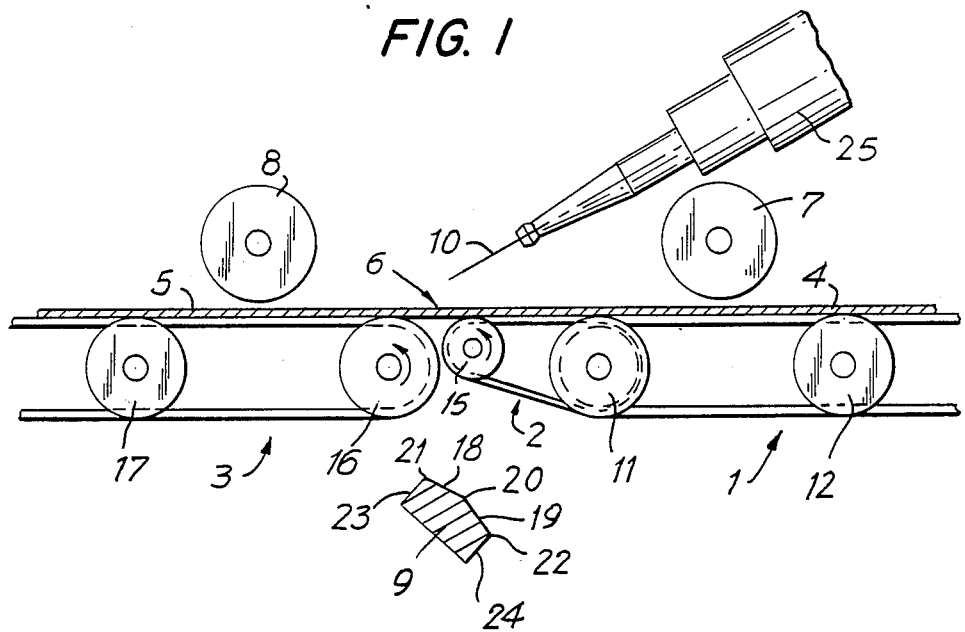

United States Patent [19]

Oldeman

[11] Patent Number: 4,922,774

[45] Date of Patent: May 8, 1990

[54] CUTTING DEVICE FOR CUTTING A STRIP OF UNVULCANIZED RUBBER

[75] Inventor: Robert-Coen Oldeman, Zwolle, Netherlands

[73] Assignee: VMI Epe Holland B.V., Epe, Netherlands

[21] Appl. No.: 292,193

[22] Filed: Dec. 30, 1988

[30] Foreign Application Priority Data

Jan. 14, 1988 [NL] Netherlands ............... 8800077

[51] Int. Cl.⁵ ........................................... B26D 7/14
[52] U.S. Cl. ............................................ 83/175; 83/282; 83/453; 83/517; 83/614; 83/623; 83/701
[58] Field of Search ............ 83/13, 18, 56, 175, 83/155, 176, 614, 282, 418, 452, 453, 513, 517, 623, 647, 701

[56] References Cited

U.S. PATENT DOCUMENTS

| | | | |
|---|---|---|---|
| 2,539,240 | 1/1951 | Firestone | 83/18 |
| 2,948,177 | 8/1960 | Arvidson . | |
| 3,737,361 | 6/1973 | Obeda . | |
| 4,391,168 | 7/1983 | Gerber et al. | 83/56 |
| 4,437,369 | 3/1984 | Brocklehurst et al. | 83/18 |
| 4,488,465 | 12/1984 | Brand et al. | 83/175 |
| 4,567,797 | 2/1986 | Folk | 83/56 |
| 4,601,225 | 7/1986 | Starnes et al. | 83/175 |

FOREIGN PATENT DOCUMENTS

| | | |
|---|---|---|
| 0105748 | 4/1984 | European Pat. Off. . |
| 2638884 | 2/1978 | Fed. Rep. of Germany . |
| 2805870 | 8/1979 | Fed. Rep. of Germany . |
| 2087290 | 5/1982 | United Kingdom . |
| 2178686 | 2/1987 | United Kingdom . |

*Primary Examiner*—Douglas D. Watts
*Assistant Examiner*—Scott A. Smith
*Attorney, Agent, or Firm*—Pennie & Edmonds

[57] ABSTRACT

A cutting device for cutting strips of unvulcanized rubber to proper lengths for building a pneumatic tyre, in particular a radial tyre, said device comprising at least one conveyor and a cutting apparatus working crosswise with respect to said conveyor for cutting a strip of unvulcanized rubber, wherein said apparatus for cutting said strip comprises means to vibrate a knife longitudinally to and fro with high frequency e.g. ultrasonic frequency and means to move the knife vibrating longitudinally to and fro along a track crosswise with respect to said strip.

8 Claims, 3 Drawing Sheets

CUTTING DEVICE FOR CUTTING A STRIP OF UNVULCANIZED RUBBER

The invention relates to a cutting device for cutting strips of unvulcanized rubber to proper lengths for building a pneumatic tire, in particular a radial tire, said device comprising a conveyor and a cutting apparatus working crosswise with respect to said conveyor for cutting a strip of unvulcanized rubber.

Each radial pneumatic tire consists of a carcass with at the inside at least one air-tight layer to provide that the air pumped into the tire does not escape. Furthermore, strips are applied on said carcass to form the sidewalls of said tire and also strips are applied to form chafers to protect the beads of said tire. Also a strip of white rubber mixture with a covering strip thereon in a thick strip forming a sidewall of said tire can be applied, and after vulcanizing the covering strip is grinded, so that a white decoration strip decorates the completed tire.

All these strips should each be cut off from a long strip shaped supply into a proper length, that the ends of each strips situated on a building drum of a tire building machine join each other. With all above mentioned types of strip shaped material said joining is necessary to make the tire as homogeneous as possible, so that said tire rolls uniformly and is uniformly strong, which is only possible if each strip at its splice shows no slit with the joint between its both ends. Such a slit in the above mentioned white strip is moreover a disadvantage, because in situ of the slit the white strip is interrupted and marred by black smudges. Besides, said joining is particularly necessary for constructing the above mentioned air-tight layer in order to splice the ends of the strip or strips in an air-tight way to each other over their complete width.

It is known to cut said strips in proper lengths along an oblique cutting line by means of cutting or sawing discs rotating at high speed or by hot knives which are pulled through each strip at low speed. The friction between the unvulcanized rubber and the cutting or sawing discs is reduced by moistening these discs with high-grade alcohol, but high-grade alcohol is expensive and is consumed rapidly. With hot knives the temperature should be adjusted very accurately, because with a too hot knife the knife becomes dirty and/or vulcanizes the unvulcanized rubber which comes into contact with said knife, while with a too cold knife the cut in the unvulcanized rubber is rough and irregular. However, keeping the knives accurately at the right temperature appeared to be hardly possible in practice.

According to the present invention above disadvantages of the known installations can be removed in that the apparatus for cutting the strip comprises means for vibrating a knife longitudinally to and fro with high frequency e.g. ultrasonic frequency and means to move said knife along a track crosswise with respect to said strip.

Indeed the application of the knives vibrated to and fro with high frequency along their length are known per se for cutting thick film of synthetic material, but application in practice showed that this type of knife does not produce the desired result with unvulcanized rubber in that among others the fresh cut rubber elements adhere again to each other. Moreover, the known installations are not suitable for the application of this type of knife.

That is why the invented device preferably is characterized by means for clamping the strip against conveyors at both sides of the cut to be produced and by means for subsequently stretching the clamped portion of said strip during cutting, said strip being put back in condition for conveying by the conveyor by removing the clamping after the strip has been cut to the proper length.

As a result of this the cut surfaces of unvulcanized rubber are immediately pulled away from each other after the cutting, so that adhesion of said cutting surfaces to one another is not possible.

These and other advantages and characteristics of the invention will be further described in the following description of an embodiment of the invented device and wherein it is referred to the enclosed drawings. It will be apparent that the invention is not restricted to the described embodiment as shown in the drawings, because said embodiment is only an example.

In the drawing is:

FIG. 1 a schematical side view of the invented device in the conveying condition.

Figure 2:
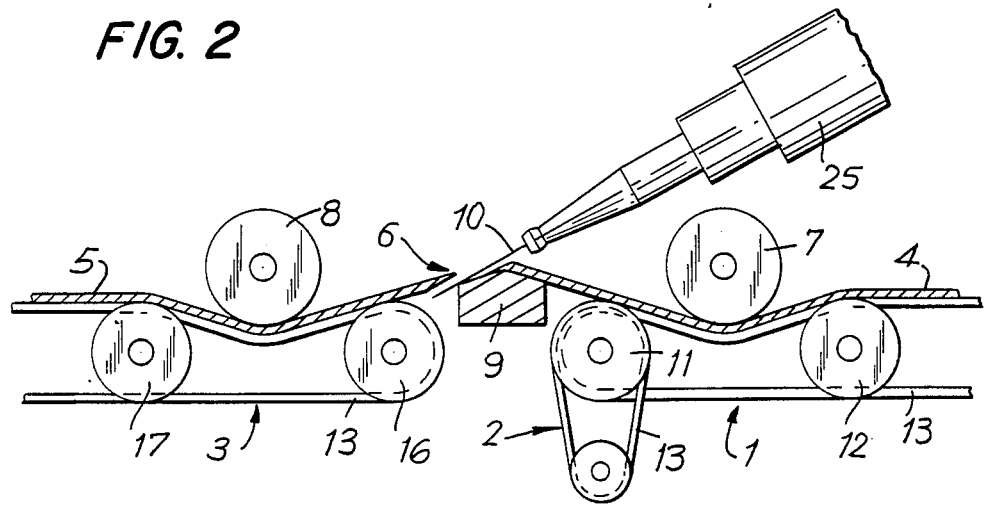

FIG. 2 a side view as in FIG. 1 but the device is in the cutting condition.

Figure 3:
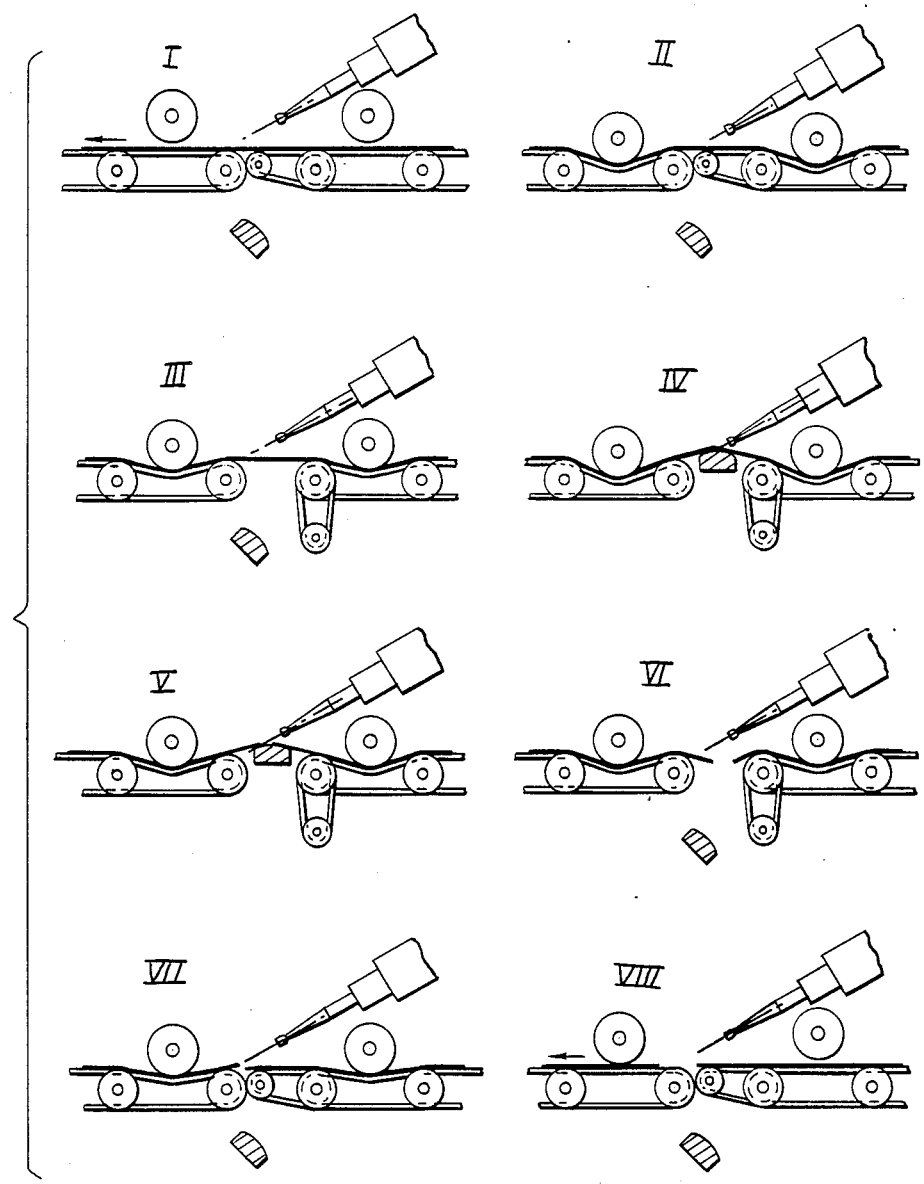

FIG. 3 a schematical indication of the phases of the work cyclus of the device according to FIG. 1.

Figure 4:
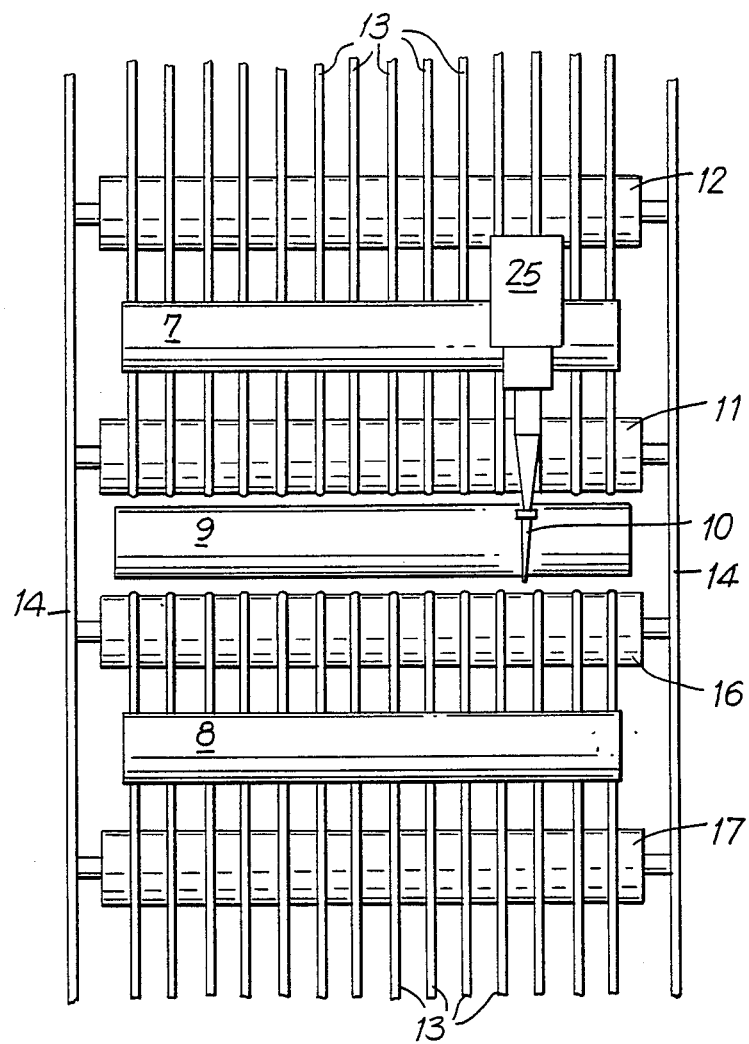

FIG. 4 a schematical top view of the device according to FIG. 1.

The invented device comprises according to FIG. 1 in principle a supply conveyor 1, an intermediate conveyor 2 and a discharge conveyor 3. The phases of the work cyclus of the invented device are shown in FIG. 3. In phase I a strip 4 of unvulcanized rubber is conveyed from a storing reel (not shown) over these three conveyors from the right to the left. As soon as a piece 5 of strip with the desired length is situated with its rear end 6 above the intermediate conveyor 2, all conveyors are stopped. Subsequently in phase II in FIG. 3 a clamping roller 7 cooperating with the supply conveyor 1 is moved downwardly from the position shown in FIG. 1 to the position shown in FIG. 2, as a result of which the strip 4 is forced against the supply conveyor and thereby it cannot be moved forward any more. Simultaneouly also in phase II in FIG. 3 a clamping roller 8 cooperating with the discharge conveyor 3 is moved downwardly from the position shown in FIG. 1 to the position shown in FIG. 2, as a result of which the piece strip 5 is forced against the discharge conveyor 3 and is not movable any more.

Subsequently, in phase III shown in FIG. 3 the intermediate conveyor 2 is pivoted downwardly from the position shown in FIG. 1 to the position shown in FIG. 2. Afther that, in phase IV shown in FIG. 3 a cutting beam 9 is moved upwardly from the position according to FIG. 1 to the position shown in FIG. 2. In the position shown in FIG. 2 the top of the cutting beam 9 lies higher than the upper courses of the conveyors 1 and 2, so that the rubber strip 4 of rubber is stretched as on the one hand the strip is clamped between the clamping roller 7 and the supply conveyor 1 and on the other hand between the clamping roller 8 and the discharge conveyor 3.

Subsequently the above, in phase V shown in FIG. 3 the knife 10 is moved crosswise with respect to the strip 4 and simultanuously the knife is vibrated longitudinally to and fro with high frequency, e.g. ultrasonic frequency. After the strip 4 has been cut, the cutting beam 9 is moved downwardly in phase VI shown in FIG. 3 from the position shown in FIG. 2 to the position shown in FIG. 1.

Subsequently, in phase VII shown in FIG. 3 the intermediate conveyor 2 is moved upwardly from the position shown in FIG. 2 to the position shown in FIG. 1 to fill up the gap between the supply conveyor 1 and the discharge conveyor 3 as much as possible. Finally, in phase VIII shown in FIG. 3 the clamping rollers 7 and 8 are moved upwardly from the position shown in FIG. 2 to the position shown in FIG. 1, so that the strip 4 and the length 5 cut off from the strip are free with respect to the clamping rollers. After that first the cut off length 5 is discharged to the building drum for pneumatic tires (not shown) by means of the discharge conveyor 3 for further processing, and subsequently the strip 4 is supplied further from a storing reel (not shown) to the discharge conveyor 3 by means of the supply conveyor 1 via the intermediate conveyor 2 in the phase I shown in FIG. 3, after which the remaining, above described phases shown in FIG. 3 can be executed again. The storing reel and the building drum are not shown in the drawings and not described here, because they are known.

It will be apparent that the supply conveyor 1 shown in FIG. 1 comprises a reversing roller 11 and a supporting roller 12 and where preferably, as shown in FIG. 4, endless strings 13 run over these rollers. Besides, these endless strings run over supporting rollers situated outwardly from FIG. 1 and 4 and a driven, second reversing roller. Said strings are made from elastic material which moreover can be resilient.

The reversing roller 11 and the supporting roller 2 are rotatably secured in a frame 14 as shown in FIG. 4 and are situated close to each other in such a way that when the clamping roller 7 (FIG. 2) has been moved into a downward position a strip 4 of unvulcanized rubber on the strings 13 is sufficiently clamped between the strings 13 and the clamping roller in its downward position as shown in FIG. 2. The means for moving the clamping roller 7 (FIG. 1 and 2) downwardly and upwardly again are not indicated in the drawings and also not discussed, because for this movement means are used which are obvious for an expert.

Preferably the one reversing roller of the intermediate conveyor 2 is at the same time the reversing roller 11 of the supply conveyor 1 as shown in FIG. 2. Endless strings run over said reversing roller 11 and also over the other reversing roller 15 of the intermediate conveyor 2. The means for pivoting the intermediate conveyor 2 about the axis of the reversing roller 11 downwardly and upwardly again (FIG. 1 and 2) are neither indicated in the drawings nor discussed, because these means are obvious for experts.

Also the discharge conveyor 3 shown in FIG. 1 comprises a reversing roller 16 and a supporting roller 17, where e.g. endless strings 13 run over said rollers as shown in FIG. 4.

These endless strings run moreover over supporting rollers and a driven, second reversing roller, all these rollers being situated outwardly from FIG. 1 and 4. The reversing roller 16 and the supporting roller 17 are rotatably secured in a frame 14 as shown in FIG. 4 and are situated close to each other in such a way that when a clamping roller 8 (FIG. 2) has been moved into a downward position the piece 5 of the strip of unvulcanized rubber on the strings 13 is sufficiently clamped between the strings 13 and clamping roller 8 moved downwardly as shown in FIG. 2. The means for moving the clamping roller 8 (FIGS. 1 and 2) downwardly and upwardly again are neither indicated in the drawings nor discussed, because for this means may be used which are obvious for an expert.

The cutting beam 9 is preferably made of Teflon and the upper side of the cutting beam shown in FIG. 1 is composed of two crossectionally sloping surfaces 18 and 19 which join each other via a rounded off surface 20. Each sloping surface 18 and 19 is joined via a rounded off surface 21, 22 respectively to a side 23, 24 respectively of the cutting beam. The rounding off 21 is such that the knife 10 can be positioned with an angle between 10 and 90 degrees with respect to the strip 4 of unvulcanized rubber while the knife blade bears on the cutting beam. The means for moving the cutting beam 9 (FIG. 1 and 2) upwardly and downwardly again are neither indicated in the drawings nor discussed, because for this means may be used which are obvious for an expert.

The apparatus 25 for vibrating the knife 10 with high frequency, e.g. ultrasonic frequency, longitudinally to and fro (consequently in the plane of the drawings) is only schematically indicated in FIGS. 1 and 2 and is not discussed further, because such an apparatus is known per se for cutting film of synthetic material. Means for moving the apparatus 25 with the knife 10 from the right to the left and back over the width of the strip 4 in FIG. 4 are neither indicated in the drawings nor discussed, because for this movement means may be used which are obvious for an expert.

It is important that the knife 10 with the drive apparatus 25 is pivotably mounted such, that the knife in the strip 4 of unvulcanized rubber can make a cut with an angle of inclination, which can be selected between 10 and 90 degrees with respect to the length of the strip. Also these pivotable securing means for the drive apparatus 25 are neither indicated in the drawings nor discussed, because for this means may be used which are obvious for a expert.

It is also important that the free, pointed end of the knife 10 is free and remains free with respect to the cutting beam 9 and also that it does not contact with other members, but the knife blade should bear on the cutting beam.

By clamping the strip 4 of unvulcanized rubber between the clamping rollers 7 and 8 and the supply conveyor 1, the discharge conveyor 3 respectively it is prevented that the strip can move, because when it moves irregular cuts are the result.

The cutting beam 9 moved upwardly as shown in FIG. 2 stretches the strip 4, resulting in that the cut surfaces facing each other move away from each other immediately on the movement of being cut by the knife 10. The result is that the adhesion to each other of cut surfaces of unvulcanized rubber is prevented.

Besides, the strip 4 is supported by the cutting beam 9 with as a result that a cut without irregularities is produced in the strip.

Finally, the conveyor 2 in its normal position as shown in FIG. 1 causes a non disturbed conveyance of the strip 4 from the supply conveyor 1 to the discharge conveyor 3.

Because the knife according to the invention is vibrated with high frequency, e.g. ultrasonic frequency, longitudinally to and fro, it is avoided that the knife has to be kept moistened with high-grade alcohol, which is consumed rapidly and therefore should be applied in large quantities in known cutting machines with fastly rotating cutting discs or sawing discs. Using large quantities of high-grade alcohol for reducing the friction between unvulcanized rubber and cutting discs or sawing discs is therefore expensive and is consequently avoided by the invention. Also heating of the knife is avoided according to the invention, because a too hot knife causes vulcanization of unvulcanized rubber at the cut and/or contamination of the knife, while a too cold knife causes an irregular cut. Keeping the knife constantly at the right temperature has appeared to be hardly possible in practice, so that the invention offers a solution for this problem.

Besides, the invented device is completely adjusted to the knife vibrating to and fro with high frequency. That is why the time necessary for realising a cut is less than the time necessary for building a pneumatic tire. Furthermore, the invented construction makes the optimum use of a knife vibrating to and fro with high frequency possible. Finally, by clamping the strip by means of the clamping rollers during cutting and by stretching the strip by means of the cutting beam during cutting, the fresh cut faces of unvulcanized rubber do not have the opportunity of adhere to each other. Besides, the strip is supported by the cutting beam during cutting with as a result that the cut is regular. Finally, the strip is well conveyable from the supply conveyor to the discharge conveyor by means of the intermediate conveyor.

I claim:

1. A cutting device for cutting strips of unvulcanized rubber to proper lengths for building a pneumatic tire in particular a radial tire, said device comprising a conveyor on each side of a cutting apparatus working crosswise with respect to said conveyors for cutting a strip of unvulcanized rubber, characterized in that said apparatus for cutting said strip comprises means to vibrate a knife longitudinally to and fro with ultrasonic frequency; means to move the knife vibrating longitudinally to and fro along a track crosswise with respect to said strip; clamping means for clamping said strip against said conveyors at both sides of the desired cut and stretching the strip between the clamps during cutting, said strip being put back in condition for conveying by the conveyors by releasing the clamps after the strip has been cut to proper length; and an intermediate conveyor between said conveyors, said intermediate conveyor being pivotable in order to make room for a cutting beam, said cutting beam being movable upwardly for a retired position into a raised position wherein it pushes a strip of unvulcanized rubber upwardly out of its normal position while cutting the strip, and the cutting beam after the cutting operation being movable downwardly to the retired position to make room for said intermediate conveyor.

2. A cutting device according to claim 1, characterized in that each conveyor comprises an endless carrier element for the strips to be conveyed, wherein the carrier element extends over a reversing roller situated near said intermediate conveyor and over a supporting roller, each clamping means being movable from a position releasing the carrier element with the strip thereon downwardly into a position for pushing the carrier element with the strip down; the reversing roller, the clamping means and the supporting roller being situated at a sufficient distance from each other to clamp the strip on the carrier element in the downwardly pushed position of the clamping means where the clamping means is movable upwardly again from said clamping position to the releasing position.

3. A cutting device according to claim 2, characterized in that each carrier consists of a series of endless strings.

4. A cutting device according to claim 2, characterized in that the intermediate conveyor consists of endless strings running over said reversing rollers.

5. A cutting device according to claim 4, characterized in that each clamping means comprises a pressing roller.

6. A cutting device according to claim 4, characterized in that the upper side of the cutting beam is formed such, that cutting angles between 10 and 90 degrees can be realised when adjusting the angle of inclination of said knife.

7. A cutting device according to claim 6, characterized in that in cross section the upper side of the cutting beam substantially consists of two sloping surfaces, which join each other by a cross sectionally rounded off surface and which each join a side wall by a cross sectionally rounded off surface.

8. A cutting device according to claim 7 characterized in that when the cutting beam is fully raised the knife bears on the cutting beam, whereas the knife is spaced from said cutting beam and the knife extends cantilevered from the cutting beam.

* * * * *